US006802410B2

(12) United States Patent
Dyson et al.

(10) Patent No.: US 6,802,410 B2
(45) Date of Patent: Oct. 12, 2004

(54) CONVEYOR ROLLER BEARING HOUSING

(75) Inventors: Kingsley Bruce Dyson, Lesmurdie (AU); Derek Alfred Sealey, Padbury (AU)

(73) Assignee: JLV Industries Pty Ltd, Myaree (AU)

( * ) Notice: Subject to any disclaimer, the term of this patent is extended or adjusted under 35 U.S.C. 154(b) by 24 days.

(21) Appl. No.: 10/258,358

(22) PCT Filed: Apr. 11, 2001

(86) PCT No.: PCT/AU01/00414
§ 371 (c)(1),
(2), (4) Date: Nov. 25, 2002

(87) PCT Pub. No.: WO01/81213
PCT Pub. Date: Nov. 1, 2001

(65) Prior Publication Data
US 2003/0136628 A1 Jul. 24, 2003

(30) Foreign Application Priority Data
Apr. 19, 2000 (AU) ............................. PQ 7034

(51) Int. Cl.$^7$ ............................................. B65G 39/09
(52) U.S. Cl. ....................... 193/37; 384/146; 384/478; 384/484
(58) Field of Search ........................... 193/37; 384/144, 384/146, 478, 480, 484

(56) References Cited
U.S. PATENT DOCUMENTS

| | | | | |
|---|---|---|---|---|
| 1,362,910 A | * | 12/1920 | Zoeller et al. | 384/546 |
| 3,086,826 A | * | 4/1963 | Gunnell | 384/418 |
| 3,353,644 A | | 11/1967 | McNash et al. | |
| 4,121,694 A | * | 10/1978 | Nelson | 184/6 |
| 4,339,159 A | * | 7/1982 | Miller | 384/539 |
| 4,458,957 A | * | 7/1984 | Greener | 384/538 |
| 4,852,230 A | * | 8/1989 | Yu | 29/898.07 |
| 5,074,408 A | * | 12/1991 | Smith et al. | 198/842 |
| 5,188,214 A | * | 2/1993 | Uttke et al. | 198/501 |
| 5,261,528 A | * | 11/1993 | Bouchal | 198/842 |
| 5,380,104 A | * | 1/1995 | Garnett | 384/546 |
| 5,433,308 A | * | 7/1995 | Gagnon | 193/37 |
| 5,642,800 A | * | 7/1997 | East | 193/37 |
| 5,714,817 A | * | 2/1998 | Norris | 310/90 |
| 5,944,161 A | * | 8/1999 | Sealey | 193/37 |
| 6,148,986 A | * | 11/2000 | Brink et al. | 193/37 |
| 6,206,182 B1 | * | 3/2001 | Wilson et al. | 198/842 |
| 6,209,702 B1 | * | 4/2001 | Agnoff | 193/37 |
| 6,234,293 B1 | * | 5/2001 | Fasoli | 193/37 |
| 6,287,014 B1 | * | 9/2001 | Salla | 384/546 |
| 6,454,077 B2 | * | 9/2002 | Nimmo et al. | 193/37 |
| 6,547,054 B2 | * | 4/2003 | Gamache | 193/37 |
| 6,682,077 B1 | * | 1/2004 | Letourneau | 277/412 |

FOREIGN PATENT DOCUMENTS

GB 1591193 A 6/1981

* cited by examiner

*Primary Examiner*—Douglas Hess
(74) *Attorney, Agent, or Firm*—Dougherty, Clements, Hofer & Bernard

(57) ABSTRACT

A polyurethane conveyor roller end cap internally houses rolling bearing and externally is interference-fitted into an end of a roller tube. The outside surface of the body of an end cap, although arranged in large part to engage the tube, has provided therein a circumferential line of blind recesses designed to minimize the amount of polyurethane used for the end cap while still allowing for the provision of load bearing column of polyurethane.

8 Claims, 5 Drawing Sheets

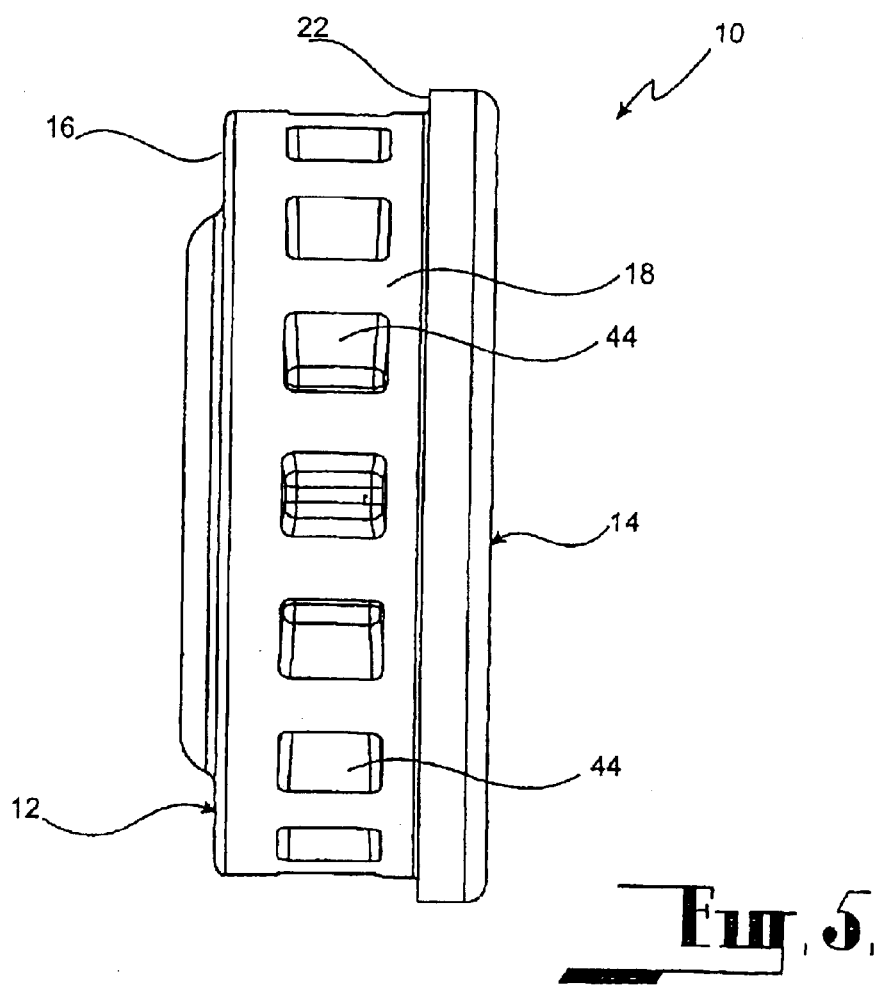

CONVEYOR ROLLER BEARING HOUSING

FIELD OF THE INVENTION

The present invention relates to a conveyor roller bearing housing. More particularly, the conveyor roller bearing housing of the present invention is intended to minimize relative movement between the bearing housing and the roller tube.

BACKGROUND ART

A polyurethane end cap assembly for the roller tube of conveyor rollers is described in Australian Patent 686028 to the present applicant. The end cap assembly is described as comprising a solid end cap body which is interference fitted within an end of a roller tube and in which is received a bearing. The bearing is fitted within the end cap body from an inner side of the end cap body, thereby minimizing the exposure of the bearing to dust and dirt from outside the conveyor roller. A removable inner seal means is snap fitted within the end cap body behind the bearing and acts to seal the bearing from any dust and dirt within the conveyor roller. The outer face of the bearing is sealed by an inner collar portion of the end cap body which projects inwardly towards the roller shaft and on which are provided a pair of arms. One of these arms engages an inner race of the bearing whilst the other engages the shaft. Further, a dust seal is press fitted to the roller shaft externally to the end cap body and projections provided thereon engage lightly an outer surface of the end cap body allowing free rotation of one relative to the other, but providing an initial barrier to the ingress of dust and dirt to the end cap assembly.

Whilst the end cap assembly described in Australian Patent 686028 operates well in dampening noise and vibration in conveyor rollers, it consumes a large volume of polyurethane which manifests as high production costs.

A conveyor roller having a socket adapted to hold the bearing within the roller tube is described in SU 1671566. Further, the socket is shown to comprise recesses (5) and (9) provided in the inner and outer faces thereof, these recesses projecting into the socket and encroaching between the bearing and the roller tube. A conveyor roller with end covers provided between the bearing and the roller tube is described in EP 0799777. The end cover is the equivalent of the socket of SU 1671566 and similarly has recesses provided in the inner and outer faces thereof, at least one of these recesses encroaching between the bearing and the roller tube.

WO 97/47541 describes therein a conveyor roller comprising in part a shaft, about which a bearing is provided, the bearing being held within adaptors. The adaptors have protrusions projecting radially therefrom to engage the inner surface of the roller tube and facilitate the mechanical connection therebetween. The protrusions are arranged in a lateral manner relative to the length of the roller and shaft, and not in a longitudinal manner. The protrusions are not located directly between the bearing and the roller tube, but are rather spaced apart therefrom.

The above constructions of SU 1671566, EP 0799777, and WO 97/47541, if the end cap/end cover/socket were to be made, at least in part, of a deformable or at least partly flexibly resilient material such as polyurethane, would be subject to slippage and consequently increased wear and vibration. During use, a polymeric material such as polyurethane is subject to stress relaxation, this having a detrimental effect on the fit of the end cap within the roller housing. This may lead to damage and/or destruction of the end cap during continued use.

The conveyor roller shaft bearing housing of the present invention has as one object thereof to substantially overcome the above problems associated with the prior art, or to at least provide a useful alternative thereto.

The preceding discussion of the background art is intended to facilitate an understanding of the present invention only. It should be appreciated that the discussion is not an acknowledgement or admission that any of the material referred to was part of the common general knowledge in Australia as at the priority date of the application.

Throughout this specification, unless the context requires otherwise, the word "comprise", or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a conveyor roller bearing housing characterised by comprising a body portion proportioned to receive and locate in a bearing seat therein at least one bearing, and to be disposed between at least one of the or each bearing and a roller tube, the body portion further having an outer surface arranged in large part to engage the roller tube, wherein the body portion has provided therein at least one recess in the outer surface to reduce the volume of material in the body portion, whereby there is at all times a load bearing column in the body portion between the bearing seat and the outer surface to substantially minimise any stress relaxation therein.

Preferably, the or each recess provided in the outer surface is located intermediate forward and rear faces provided on the body portion.

Still preferably, a plurality of recesses are provided in the outer surface extending radially into the body portion at regular intervals thereabout.

In one form of the present invention the body portion is formed of a flexibly resilient material. Preferably, the body portion is formed of polyurethane.

In another form of the present invention the or each radial recess has an insert provided therein. The insert may be formed of a stronger or harder material than that from which the body portion is formed.

Preferably, any recesses provided in the forward or rear faces of the body portion do not encroach upon the area thereof located radially between at least one of the or each bearings and the roller tube.

BRIEF DESCRIPTION OF THE DRAWINGS

The conveyor roller bearing housing of the present invention will now be described, by way of example only, with reference to one embodiment thereof and the accompanying drawings, in which:

FIG. 3 is a cross-sectional view of the arrangement shown in FIG. 2, with the addition of a roller shaft about which an inner race of the bearing is slide-fitted and adhered to;

FIG. 5 is a side elevational view of the bearing housing of FIG. 1.

BEST MODE(S) FOR CARRYING OUT THE INVENTION

Figure 1:
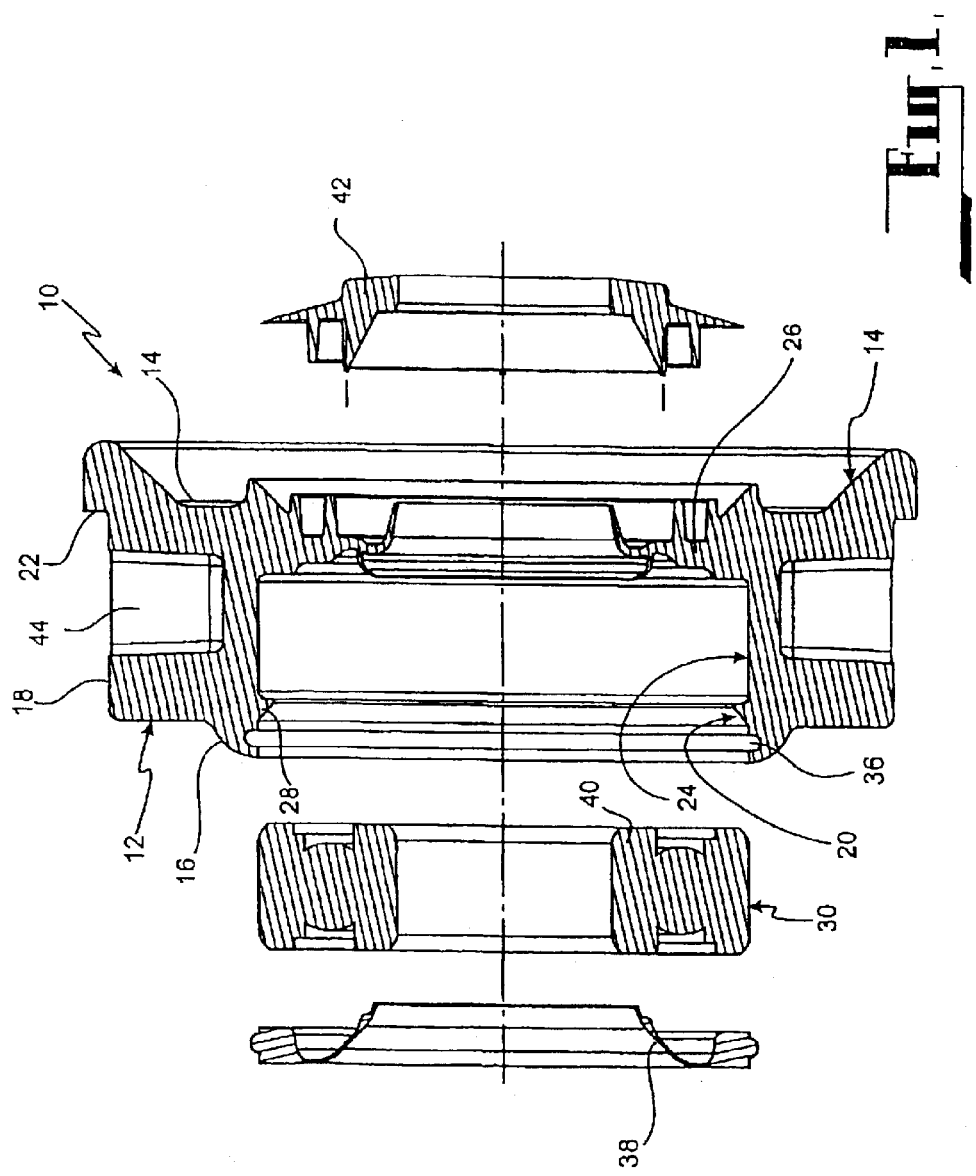
FIG. 1 is an exploded cross-sectional view of a conveyor roller bearing housing in accordance with the present invention, showing in addition a dust seal adjacent a forward face of the bearing housing, a bearing prior to press-fitting within the bearing housing, and an inner seal means which in use is snap fitted within a rear face of the bearing housing.

In FIGS. 1 to 4 there is shown a bearing housing 10 for a conveyor roller in accordance with the present invention, the bearing housing 10 comprising an annular body portion 12 formed of polyurethane and having a forward face 14 and a rear face 16. The bearing housing 10 further comprises an outer surface 18 and an inner annular surface 20.

The outer surface 18 has a shoulder 22 provided therein, the outer surface 18 being of greater diameter adjacent the forward face 14 than it is adjacent the rear face 16.

Figure 2:
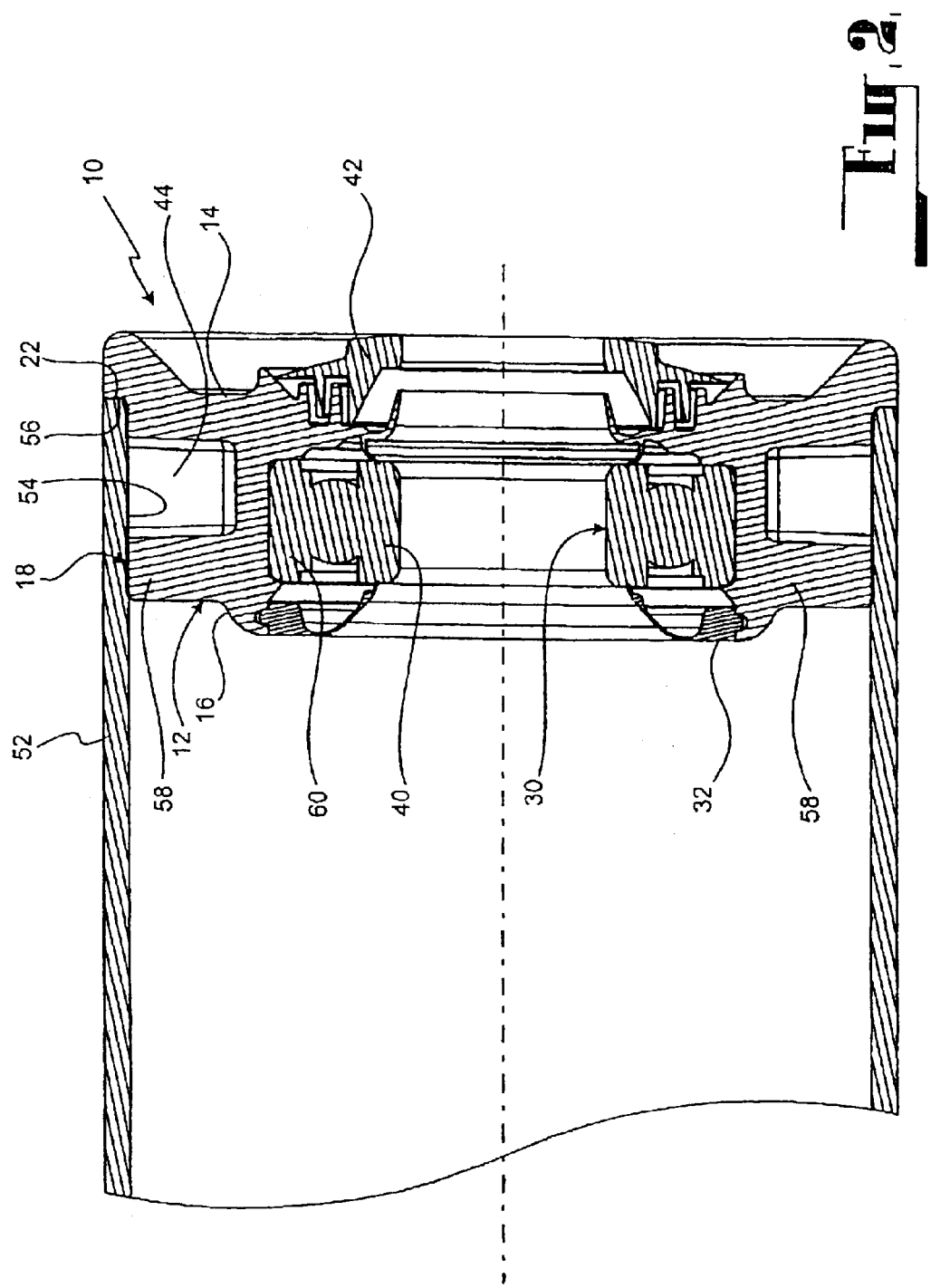
FIG. 2 is a cross-sectional view of the bearing housing of FIG. 1, showing the bearing housing press-fitted within a roller tube of a conveyor roller, and further showing the bearing fitted within the bearing housing and the inner seal means snap fitted to the rear face thereof.
Figure 3:
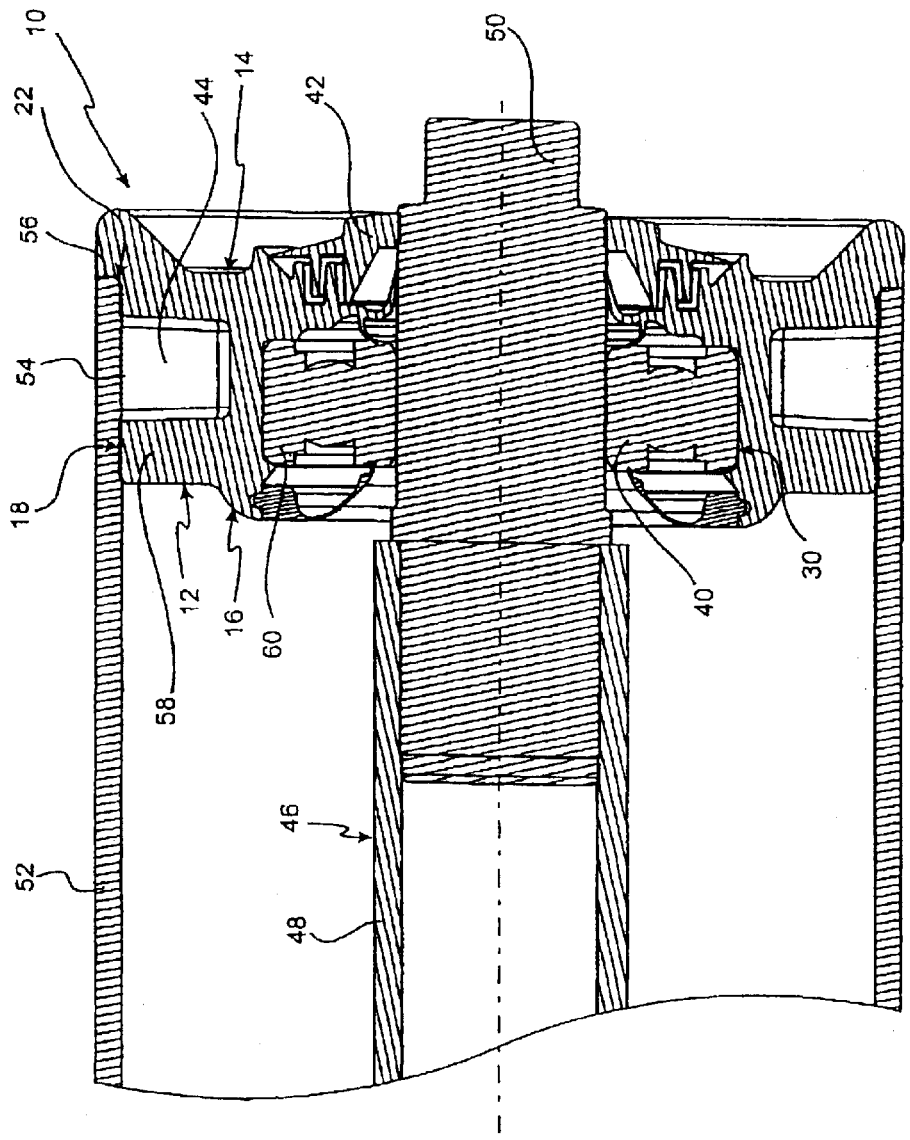
Figure 4:
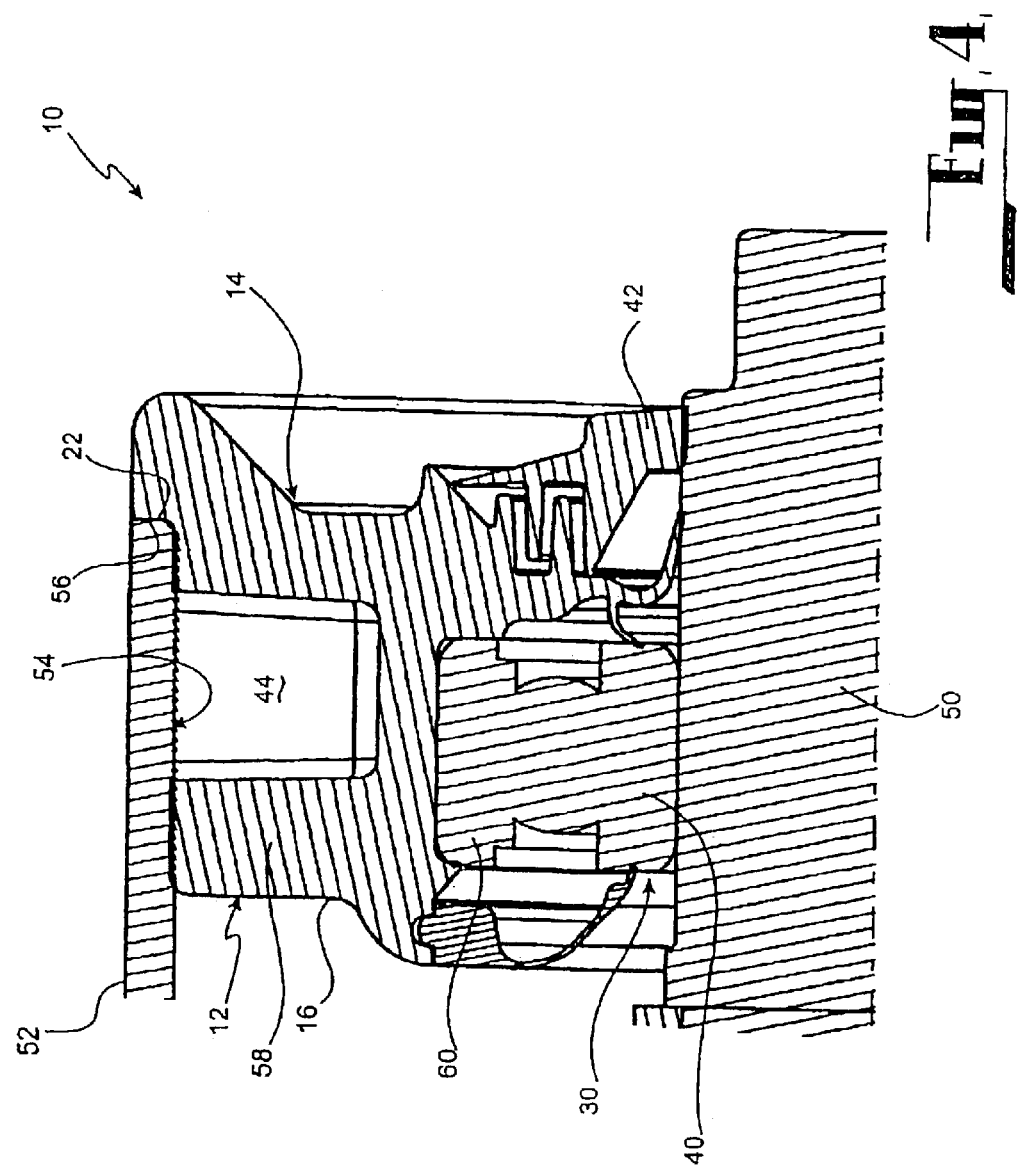
FIG. 4 is a partial cross-sectional view of the arrangement of FIG. 3.

The inner annular surface 20 defines therein a bearing seat 24 between a forward neck portion 26 and a rear shoulder 28. A bearing 30 is able to be press-fitted into the bearing seat 24 over the rear shoulder 28 and against the forward neck portion 26, as is best seen in FIGS. 2 to 4.

An annular inner seal means 32 has provided thereon a peripheral projection 34 designed to snap fit within a complimentary recess 36 provided in the rear face 16 of the body portion 12. The inner seal means 32 further comprises an inwardly and forwardly curving seal rim 38 arranged to impinge upon an inner race 40 of the bearing 30 when engaged with the body portion 12, again as best seen in FIGS. 2 to 4.

A dust seal 42 is additionally provided to be positioned against the forward face 14 of the body portion 12 to provide a preliminary seal against the ingress of dust and dirt to the bearing housing 10.

A series of regularly spaced and radially inwardly extending recesses 44 are provided in the outer surface 18 of the body portion 12. The recesses 44 do not extend fully to the bearing seat 24 and do not extend entirely from the forward face 14 to the rear face 16. The recesses 44 open onto only the outer surface 18, and may be defined as being intermediate the forward face 14 and rear face 16.

In FIGS. 3 and 4 there is shown a roller shaft 46, the roller shaft 46 comprising a hollow tube 48 and a terminal stub 50 received within an end of the hollow tube 48. The inner race 40 of the bearing 30 is shown fitted and retained about the stub 50. This arrangement allows the body portion 12 and a roller tube 52 to rotate freely about the shaft 46. The roller tube 52 has an inner surface 54 adjacent an outer end 56 thereof which is provided with serrations and into which the bearing housing 10 is press-fitted. In this arrangement the outer surface 18 positively engages the serrated inner surface 54, with the shoulder 22 abutting the outer end 56 of the roller tube 52. The dust seal 42 is press-fitted about the outer end of the stub 50 and abuts in a non-restricting manner the outer face 14 of the body portion 12. A labyrinth seal is formed between the dust seal 42 and the outer face 14 of the body portion 12, as shown in FIGS. 2 to 4.

In use, the stresses inherent in the interference fit utilised in retaining the bearing housing within the roller tube and that utilised to retain the bearing within the bearing housing may be subject to relaxation as a consequence of the properties of the material used. This may be further influenced in use by heating and cooling of the bearing housing and other components of the conveyor roller assembly.

The characteristic of the polyurethane bearing housing 10 to result in stress relaxation during use requires that there be a particular load bearing capacity in the body portion 12 between the bearing 30 and the roller tube 52. This introduces a competing interest in minimising the volume of polyurethane utilised in moulding the bearing housing 10 and the need to maintain a load bearing capacity between the bearing 30 and the roller tube 52.

The manner in which the recesses 44 are provided in the outer surface 18, rather than in the forward face 14 or the rear face 16, allows the provision of a load bearing column 58 of polyurethane, as shown in FIG. 3, between the bearing 30 and the roller tube 52 adjacent each recess 44. Between the recesses 44 there is an area of the body portion 12, being polyurethane material, such that the recesses 44 do not form a single circumferential recess or groove.

If recesses of the same or similar volume were to be provided in either the forward face 14 or rear face 16 of the body portion 12, the stress relaxation of the body portion 12 would lead to inefficient gripping of the bearing housing 10 by the inner surface 54 of the roller tube 52, and/or inefficient gripping of an outer race 60 of the bearing 30, as a result of inadequate support between the bearing 30 and the roller tube 52. The former circumstance may lead to outward (forward) displacement of the bearing housing from the roller tube. The later circumstance may lead to loss of the interference fit between the bearing and the bearing housing. Both will ultimately lead to damage and perhaps destruction of the bearing housing 10 during continued use.

It can be seen from the foregoing description that the bearing housing 10 of the present invention provides a bearing housing in which the volume of materials used is minimised whilst similarly minimising any impact upon the performance of the bearing housing 10.

It is envisaged that inserts (not shown) of a harder or less resilient material (than that from which the body portion 12 is moulded) may be provided in the recesses 44 to increase the load bearing capacity between the bearing 30 and the roller tube 52.

It is further envisaged that any recesses provided in the forward or rear faces of the body portion should not encroach upon the area thereof located radially between at least one of the or each bearings and the roller tube.

It is still further envisaged that the bearing housing 10 may be formed of any suitable polymeric material or mix thereof, in addition to polyurethane as described hereinabove.

Modifications and variations such as would be apparent to the skilled addressee are considered to fall within the scope of the present invention.

What is claimed is:

1. A conveyor roller bearing housing comprising a body portion in which is provided at least one bearing seat to seat at least one bearing, the body portion further having an outer surface arranged in large part to engage a roller tube, wherein the body portion has provided therein at least one recess in the outer surface to reduce the volume of material in the body portion, the at least one recess being arranged such that there is at all times at least one unbroken and continuous load bearing column in the body portion extending radially between the bearing seat and the outer surface to substantially minimize any stress relaxation therein.

2. A conveyor roller bearing housing according to claim 1, wherein the at least one recess provided in the outer surface is located intermediate forward and rear faces provided on the body portion.

3. A conveyor roller bearing housing according to claim 2, wherein either or both of said forward and rear faces of said body portion further comprise at least one axial recess that does not encroach upon said at least one load bearing column located radially between said at least one bearing and said roller tube.

4. A conveyor roller bearing housing according to claim 1, wherein the body portion is formed of a flexibly resilient material.

5. A conveyor roller bearing housing according to claim 4, wherein the body portion is formed of polyurethane.

6. A conveyor roller bearing housing according to claim 1, wherein the at least one radial recess has an insert provided therein.

7. A conveyor roller bearing housing according to claim 6, wherein the insert is formed of a less resilient material than that from which the body portion is formed.

8. A conveyor roller bearing housing according to claim 1, wherein a plurality of recesses are provided in the outer surface extending radially into the body portion at regular intervals thereabout.

* * * * *